US011010926B2

(12) United States Patent
Cohen et al.

(10) Patent No.: US 11,010,926 B2
(45) Date of Patent: May 18, 2021

(54) IMAGE RECOLORING FOR COLOR CONSISTENCY IN A DIGITAL MEDIUM ENVIRONMENT

(71) Applicant: Adobe Inc., San Jose, CA (US)

(72) Inventors: Scott D. Cohen, Sunnyvale, CA (US); Brian L. Price, Pleasant Grove, UT (US)

(73) Assignee: Adobe Inc., San Jose, CA (US)

( * ) Notice: Subject to any disclaimer, the term of this patent is extended or adjusted under 35 U.S.C. 154(b) by 197 days.

(21) Appl. No.: 16/380,903

(22) Filed: Apr. 10, 2019

(65) Prior Publication Data

US 2019/0236808 A1  Aug. 1, 2019

Related U.S. Application Data

(63) Continuation of application No. 15/342,041, filed on Nov. 2, 2016, now Pat. No. 10,430,973.

(51) Int. Cl.
*G06K 9/00* (2006.01)
*G06T 7/90* (2017.01)
*G06T 11/00* (2006.01)

(52) U.S. Cl.
CPC ............ *G06T 7/90* (2017.01); *G06T 11/001* (2013.01); *G06T 2207/10024* (2013.01)

(58) Field of Classification Search
CPC ......... G06T 5/005; G06T 5/50; G06T 7/408; G06T 2207/10004; G06T 2207/10024; G06T 7/90; G06T 11/001

USPC ......................................................... 382/167
See application file for complete search history.

(56) References Cited

U.S. PATENT DOCUMENTS

| | | | |
|---|---|---|---|
| 8,373,720 B2 * | 2/2013 | Voliter | G06T 11/001 345/589 |
| 10,430,973 B2 | 10/2019 | Cohen | |
| 2008/0089615 A1 | 4/2008 | Shiiyama | |
| 2015/0262549 A1 * | 9/2015 | Moroney | H04N 1/46 345/593 |
| 2018/0122053 A1 | 5/2018 | Cohen et al. | |

OTHER PUBLICATIONS

Nguyen, Rang MH, et al. "Group-Theme Recoloring for Multi-Image Color Consistency." Computer Graphics Forum. vol. 36. No. 7. 2017. (Year: 2017).*

(Continued)

*Primary Examiner* — Jonathan S Lee
(74) *Attorney, Agent, or Firm* — FIG. 1 Patents

(57) ABSTRACT

Techniques and systems are described to recolor a group of images for color consistency. Techniques include extracting color palettes for images of the group of images and generating a group theme color palette based on the color palettes for the images. Image color palettes are then mapped to the group theme color palette and the images are modified in response to the mapping. In some examples, the mapping includes discouraging multiple colors of a single color palette from mapping to a single color of the group theme color palette. Additionally, or alternatively, the mapping includes discouraging a forced mapping of a dissimilar color of an image color palette from mapping to the group theme color palette.

20 Claims, 7 Drawing Sheets
(2 of 7 Drawing Sheet(s) Filed in Color)

(56) References Cited

OTHER PUBLICATIONS

"First Action Interview Office Action", U.S. Appl. No. 15/342,041, dated Oct. 31, 2018, 23 pages.
"Notice of Allowance", U.S. Appl. No. 15/342,041, dated Apr. 9, 2019, 9 pages.
"Pre-interview First Office Action", U.S. Appl. No. 15/342,041, dated Jun. 12, 2018, 19 pages.
Aboud,"Evolutionary Algorithms for Transferring Properties Between Images Part1: Grayscale Image Colorization", Journal of Engineering 2006, Dec. 2006, pp. 975-982.
An,"User-controllable color transfer", In CGF, vol. 29, 2010, 9 pages.
Bychkovsky,"Learning photographic global tonal adjustment with a database of input/output image pairs", Proceedings of the 2011 IEEE Conference on Computer Vision and Pattern Recognition, Jun. 2011, pp. 97-104.
Caicedo,"Collaborative Personalization of Image Enhancement", Dec. 2013, 8 pages.
Chang,"Palette-based Photo Recoloring", ACM Transactions on Graphics (TOG)—Proceedings of ACM SIGGRAPH, Jul. 27, 2015, 11 pages.
Chia,"Semantic Colorization with Internet Images", ACM Transactions on Graphics (Proc. SIGGRAPH-Asia) 30, 6, 156., 2011, 7 pages.
Faridul,"Color Mapping: A Review of Recent Methods, Extensions, and Applications", Computer Graphics Forum 35, 1, Jul. 29, 2015, 30 pages.
Ferradans,"Regularized Discrete Optimal Transport", Siam Journal on Imaging Sciences 7.3 (2014), Mar. 5, 2013, pp. 1853-1882.
Freedman,"Object-to-Object Color Transfer: Optimal Flows and SMSP Transformations", IEEE Conference on Computer Vision and Pattern Recognition (CVPR), Jun. 2010, 8 pages.
Frigo,"Optimal Transportation for Example-guided Color Transfer", Asian Conference on Computer Vision, Apr. 16, 2015, 16 pages.
Greenfield,"Image Recoloring Induced by Palette Color Associations", Feb. 7, 2003, 9 pages.
HaCohen,"Non-Rigid Dense Correspondence with Applications for Image Enhancement", SIGGRAPH, 2011, 9 pages.
HaCohen,"Optimizing Color Consistency in Photo Collections", ACM Transactions on Graphics (Proc. SIGGRAPH) 529 32, 4, Jul. 2013, 9 pages.
Hwang,"Color Transfer Using Probabilistic Moving Least Squares", CVPR, 2014, 2014, 8 pages.
Joshi,"Personal Photo Enhancement Using Example Images", ACM Trans. Graph., vol. 29, No. 2. 2010, pp. 1-15., 2010, 15 pages.
Kang,"Personalization of Image Enhancement", Proceedings of the Conference on Computer Vision and Pattern Recognition, 2010, 8 pages.
Kim,"Image Recoloring with Valence-Arousal Emotion Model", Oct. 1, 2016, 8 pages.
Laffont,"Coherent Intrinsic Images from Photo Collections", ACM Transactions on Graphics (Proc. SIGGRAPH 541 Asia) 31, 6, Nov. 2012, 11 pages.
Lin,"Modeling How People Extract Color Themes from Images", In SIGCHI, ACM, Apr. 2013, 10 pages.
Murray,"Toward automaticandflexibleconcepttransfer", Jan. 2012, pp. 622-634.
Nguyen,"Illuminant Aware Gamut-Based Color Transfer", Computer Graphics Forum (Proc. Pacific Graphics) 33, 7, Mar. 2016, 10 pages.
O'Donovan,"Color Compatibility from Large Datasets", ACM Transactions on Graphics (Proc. SIGGRAPH) 30, 4, 63, Aug. 7, 2011, 12 pages.
Oliveira,"Unsupervised Local Color Correction for Coarsely Registered Images", IEEE Conference on Computer Vision and Pattern Recognition (CVPR), 2011, Jun. 2011, pp. 201-208.
Oskam,"Fast and Stable Color Balancing for Images and Augmented Reality", Proceedings of the 2012 Second International Conference on 3D Imaging, Modeling, Processing, Visualization & Transmission, Oct. 2012, pp. 4321-4323.
Park,"Efficient and Robust Color Consistency for Community Photo Collections", Jun. 2016, 9 pages.
Pitie,"Automated Colour Grading Using Colour Distribution Transfer", Computer Vision and Image Understanding 107, 2007, 31 pages.
Rabin,"Wasserstein Regularization of Imaging Problem", 18th International Conference on Image Processing (ICIP), Sep. 2011, pp. 1541-1544.
Reinhard,"Color Transfer between Images", IEEE Computer Graphics and Applications, Sep. 2001, pp. 34-41.
Shapira,"Image Appearance Exploration by Model-Based Navigation", Computer Graphics Forum, Eurographics, vol. 28 (2009), No. 2, (Mar. 30 to Apr. 3, 2009), Mar. 30, 2009, 10 pages.
Tai,"Local Color Transfer via Probabilistic Segmentation by Expectation-Maximization", Jun. 2005, 8 pages.
Tan,"Decomposing Images into Layers via RGB-space Geometry", Feb. 2017, 14 pages.
Wang,"Data-Driven Image Color Theme Enhancement", Appears in ACM Transactions on Graphics (Special Issue for SIGGRAPH Asia 2010), 11 pages.
Wen,"Example-based multiple local color transfer by strokes", Pacific Graphics 2008, vol. 27 (2008), No. 7, Jan. 2009, 8 pages.
Wu,"Content-based colour transfer", Computer Graphics forum vol. 32 (2013), No. 1 pp. 190-203, Jan. 2014, 13 pages.
Zhang,"Palette-Based Image Recoloring Using Color Decomposition Optimization", Aug. 2015.

\* cited by examiner

IMAGE RECOLORING FOR COLOR CONSISTENCY IN A DIGITAL MEDIUM ENVIRONMENT

RELATED APPLICATIONS

This Application claims priority as a continuation of U.S. patent application Ser. No. 15/342,041, filed Nov. 2, 2016, and titled "Image Recoloring for Color Consistency in a Digital Medium Environment," the entire disclosure of which is hereby incorporated by reference.

BACKGROUND

Oftentimes, users select a plurality of different digital images as part of content creation, such as to create a pamphlet, presentation, and so forth. These different digital images, however, may lack consistency in colors used as part of the images. This may cause these digital images, when viewed together, to look disjointed and lack aesthetic appeal.

One conventional technique that is used to address this lack of consistency involves manual selection of the digital images by the user in a manner that addresses color consistency. A user creating a webpage for an outdoor company, for instance, may be forced to select from digital images having similar shades of green. This may cause this user to forgo other images that might otherwise be desirable and even superior to selected images but for a lack of this color consistency.

In another conventional example, the user may manually use image editing functionality to change the colors within the image. As such, this may be resource intensive, tedious, and required detailed image editing knowledge on the part of the user. Conventional techniques have subsequently been developed to provide automatic color consistency to digital images. However, these conventional techniques typically result in overuse of similar colors and discourage use of dissimilar colors causing the images to appear "washed out." For example, an image having a red door surrounded by green foliage, when processed using conventional techniques for color consistency with other images having green foliage, results in recoloring of the door from red to green. Thus, this may appear unnatural to the user and run counter to the user's desire in including that image, e.g., for contrast by having the door "stand out" from other colors in the image.

SUMMARY

Techniques and systems for creating image group color consistency are described. In one example, a system includes an interactive tool implemented using a computing device for automatically creating color consistency for a group of digital images using techniques described herein. The system may utilize techniques for generating color palettes for images in the group of images to create a group theme color palette. The system may then map colors of image color palettes to the group theme color palette and recolor pixels of the images based on the mapping. Mapping may include determining that a color of an image color palette is too unique or different from the colors of the group theme color palette and discouraging mapping of the color. In this way, use of unique and different colors may be preserved within an image by not mapping those different colors to the group theme color palette. Alternatively, or additionally, mapping may include discouraging multiple colors of an image color palette from mapping to a single color of the group theme color palette. As a result, the system may determine a collection of similar colors across the group of images and modify the similar colors in one or more of the images in the group to be consistent with the similar colors in other images in the group.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawings will be provided by the Office upon request and payment of the necessary fee.

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
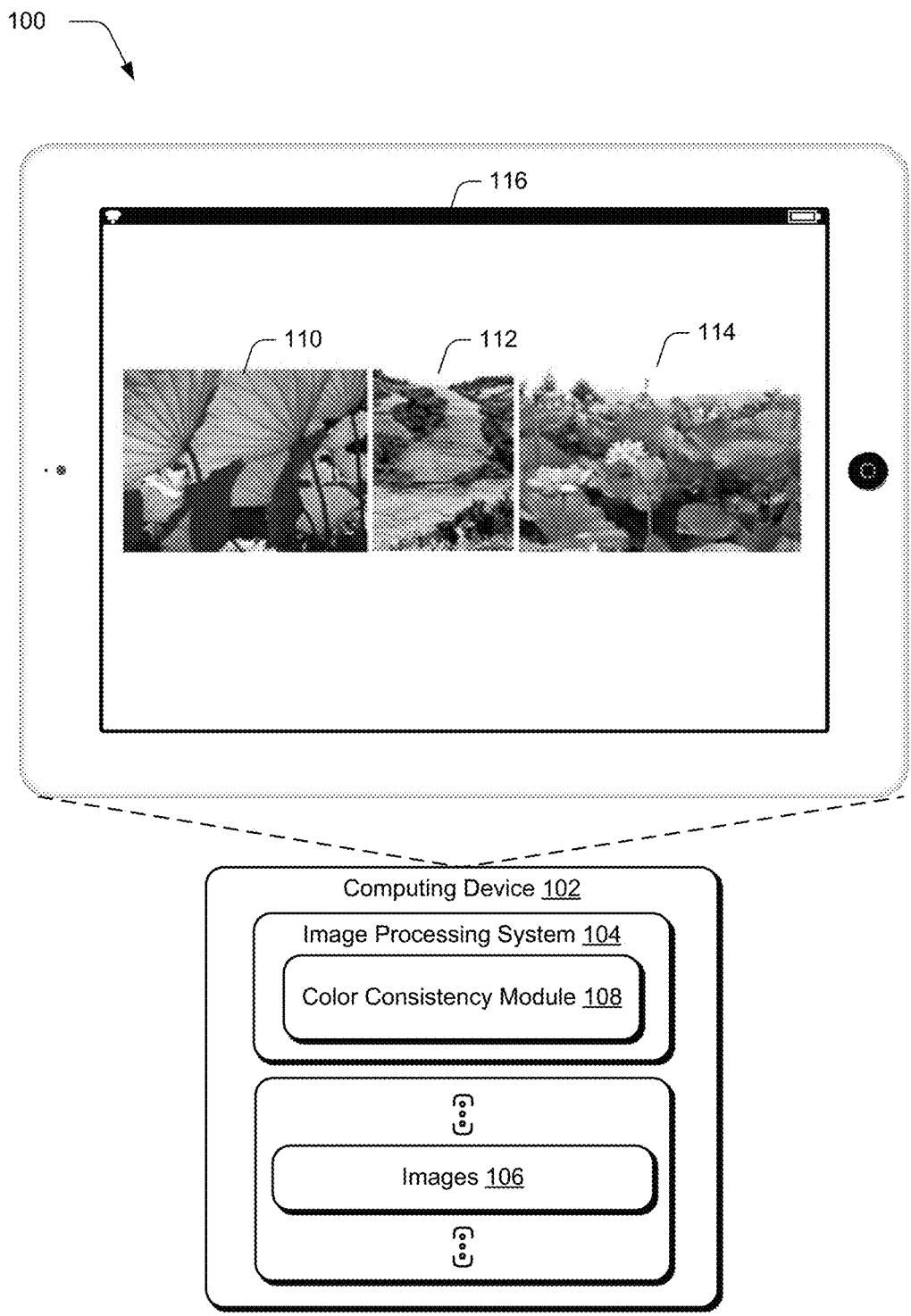
FIG. 1 is an illustration of a system in an example implementation that is operable to employ techniques for image group color consistency as described herein.

Conventional digital image group color consistency techniques rely on manual adjustments to color characteristics of each image of the group. These conventional techniques are limited by accuracy of a user in providing the inputs, by expense of obtaining these inputs from the user, and by accuracy in determining a group color theme based on multiple images. As such, these conventional techniques are often frustrating and fail for their intended purpose. Although subsequent conventional techniques have been developed for color consistency, these techniques often result in images that appear "washed out." This is often due to overuse of a small set of colors by over-mapping a large number of colors to a small subset of the colors, which thus limits a color range used by the images.

Techniques and systems are described to improve image group color consistency. In one example, techniques are employed by a computing device to aid a user in causing a collection of images to have color consistency. A user, for instance, may choose several images to use in creating media content such as a brochure, pamphlet, website, magazine, and so forth. For example, a user creating a brochure for potential university students may choose a group of images including an image of a famous campus building, an image of a famous alumnus, and an image of a nearby mountain. In practice, each of the images are typically unrelated and thus have varying color themes that may look disjointed and lack aesthetic appeal when viewed together. However, through use of the techniques described herein, a computing device may achieve image group color consistency to cause similar colors of images in the group while maintaining an aesthetic appeal of the images.

To do so in this example, an image color palette is extracted from each of the images in the group to represent the colors (e.g., dominant colors) of the respective images. The image color palettes are then analyzed by a computing device to determine a group theme color palette to represent dominant colors of two or more of the image color palettes. The image color palettes are then mapped by the computing device to the group theme color palette and the images are modified by the computing device based on the mapping. This mapping may be performed in a variety of ways. In one example, the mapping is performed by the computing device to discourage mapping multiple colors of a single image color palette to a single color of a group theme color palette ("color palette reduction"). Additionally, or alternatively, this mapping may also be performed by the computing device to discourage mapping a unique color, or a color outside of a threshold of similarity, to any colors of the group theme color palette ("forced mapping").

Using this example in more detail, assume that the image of a famous building has a color palette of dull red and yellow-green, the image of the famous alumnus has a color palette of pink and orange, and the image of the nearby mountain has a color palette of dark green, white, and light blue. The group theme color palette formed by the computing device using a k-means calculation may naturally include a yellow, a green, and a red. The dull red may be mapped by the computing device to the red, yellow-green to the yellow, pink to the red, orange to the yellow, dark green to the green, white to the yellow, and light blue to the green using a k-means calculation.

As part of this mapping, the computing device may discourage color palette reduction, such as the dark green and the light blue of the image of the nearby mountain both being mapped to the green of the group theme color palette. Discouraging color palette reduction by the computing device is used to maintain contrast in the image of the nearby mountain and prevent the image from looking washed out.

Alternatively, or additionally, the mapping may be modified by discouraging the computing device from mapping of unique colors to any group theme color. For example, taking the original k-means-based mapping described above, the white of the image of the nearby mountain is unique in the group of images and may be determined by the computing device to be outside a threshold of similarity to, or distant in the Lab color space from, the yellow of the group theme color palette. Additionally, the white from the image color palette of the nearby mountain may represent a snow-covered mountain top, which would look odd and unnatural if mapped to a yellow that is too distant from the original white of the image. Therefore, discouraging the computing device from mapping the white color of the image color palette of the nearby mountain to the yellow of the group theme color palette maintains image quality of the individual image, while still mapping the remaining image color palette colors to the group theme color palette improves color consistency.

Terms

"Color consistency" and "color coherence" refer to similarities of dominant colors of one image to another. For example, a color consistent group of images may have similar hues of red as dominant colors in each image of the group of images. Another example of a color consistent group of images may have similar hues of red and similar hues of blue as dominant colors in each image of the group of images. Color "dissimilarity" involves those colors that do not exhibit this color consistency.

"Color palette reduction" refers to mapping multiple colors of a single image color palette to a single color of a group theme color palette. For example, if an image color palette of a first image includes a red color and an orange color, both colors may be mapped to a single group theme color having a red-orange hue. If pixels of the first image upon which the red color and the orange color are base are recolored based on being mapped to the single group theme color, the color palette of the first image is reduced.

"Forced mapping" refers to forcing a dissimilar color of an image color palette to map to a color of a group theme color palette. For example, if a first image color palette includes a yellow color and the group theme color palette consists of a red color, a blue color, and a purple color, the yellow color may be forced to map to one of the red color, the blue color, or the purple color even though they are dissimilar to the yellow color.

"Unrelated images" refer to images with distinct subjects, distinct scenes, and/or distinct semantic elements. For example, a group of unrelated images may include an image of a beach and a second image of a forest. In another example, a first image may include a red door and a second image may include a red car.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital media environment 100 in an example implementation that is operable to employ techniques described herein. The illustrated environment 100 includes a computing device 102 configured for use in transforming images for color consistency, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 7.

The computing device 102 is illustrated as including an image processing system 104. The image processing system 104 is implemented at least partially in hardware to transform images 106, such as to create, edit, and otherwise modify images 106 that are stored in a computer-readable storage medium of the computing device 106. An example of such functionality is illustrated as a color consistency module 108. The color consistency module 108 is implemented at least partially in hardware in the computing device 102 to transform images 106 such that the images 106 are consistent in color while maintaining a natural appearance and unique coloring.

In an illustrated example, images 110, 112, 114 are displayed on a display device 116 of the computing device 102. These images 110, 112, 114 each capture respective outdoor scenes having primarily green tones that may differ, e.g., from light green leaves in image 110 to a yellow/green field in image 112 and dark green leaves in image 114. Accordingly, the color consistency module 108 may employ techniques such that the greens used in these images 110, 112, 114 are recolored to be consistent. However, image 114 also includes flowers that are not green. Conventional recoloring techniques would cause the flowers in the image 114 to also be recolored as green, and thus may lose an overall aesthetic appeal and appear to be "washed out." However, recoloring techniques employed by the color consistency module 108 may leave the flowers "as is" by not mapping a color of the flowers (e.g., pink) to a green, and thus preserve the color of the flowers. In this way, color consistency between the images 110, 112, 114 may be preserved while maintaining unique colors that contribute to an aesthetic appeal of the images, e.g., the pink color of the flowers in image 114. An example of operation of the color consistency module 108 to perform recoloring techniques is described in the following discussion and corresponding figure.

Figure 2:
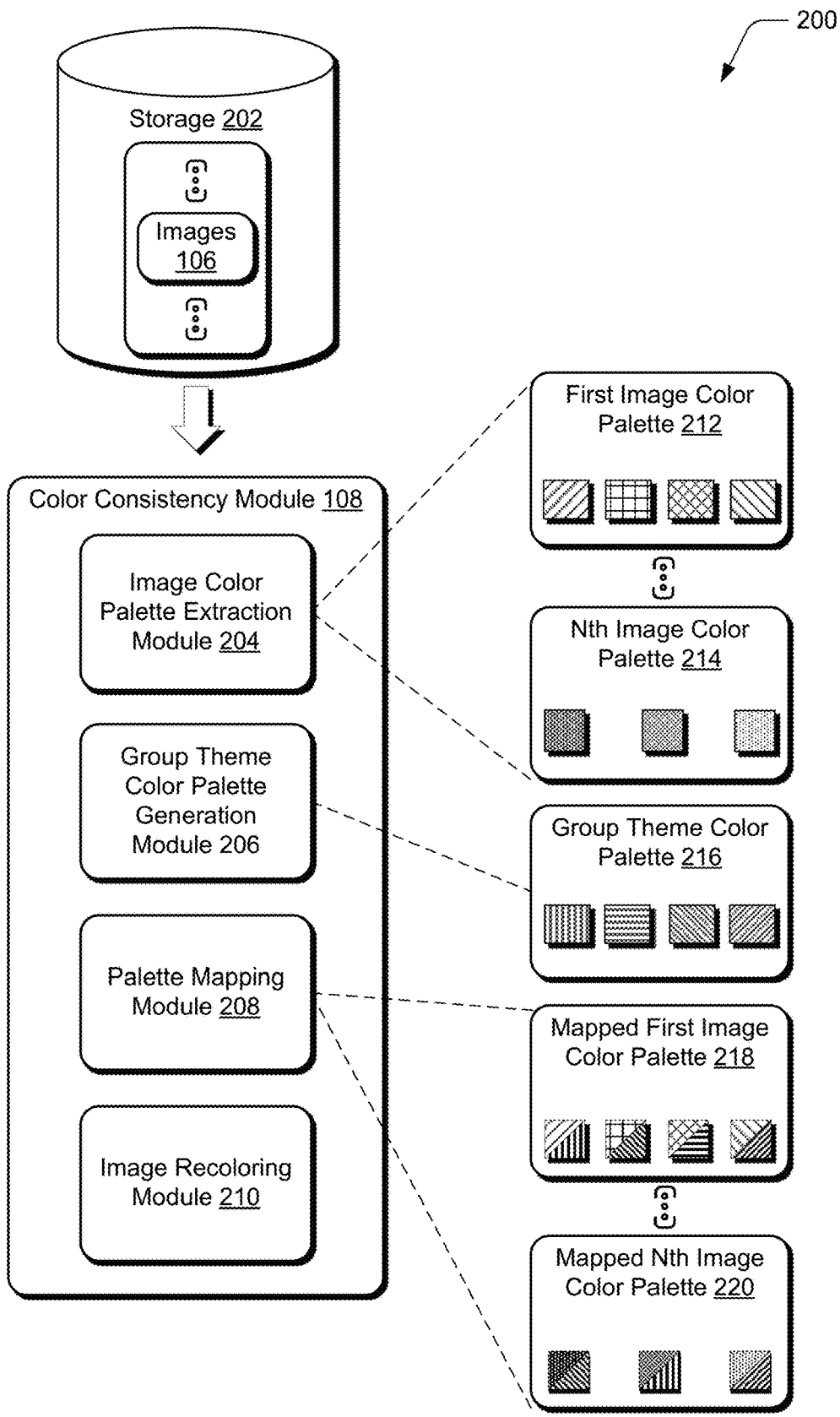
FIG. 2 depicts a system in an example implementation showing an image processing system of FIG. 1 in greater detail.

FIG. 2 depicts a system 200 in an example implementation showing operation of the color consistency module 108 to recolor images to promote color consistency. As illustrated, images 106 in storage 202 are accessed by the color consistency module 108 to perform recoloring for color consistency. In some implementations, storage 202 is local to the color consistency module 108. In other implementations, storage 202 is remote from the color consistency module 108 and may be accessed over a network using a computer application such as a web browser, image search application, or other computer application having, or allowing a user to access, images. In some implementations, the color consistency module 108 accesses, and compiles into a group of images 106, images 106 stored locally on a local storage 202 and images 106 stored remotely.

The color consistency module 108 employs an image color palette extraction module 204 that is implemented at least partially in hardware of the computing device 102. The color palette extraction module 204 is configured to extract a color palette for the images in the group of images including a first image color palette 212 and an "nth" color palette 214. The extracted color palettes 212-214 include image color palette colors representative of color clusters found in the respective images of the group of images. In some implementations, only dominant color clusters are represented in the image color palette, and thus, not every color in the image is represented by the image color palette. In the illustrated implementation, first image color palette 212 has been reduced to four colors representing the dominant colors of the first image. Nth image color palette 214 has been reduced to three dominant colors of the Nth image.

Having extracted image color palettes 212 and 214, the color consistency module 108 then employs a group theme color palette generation module 206 that is implemented at least partially in hardware of the computing device 102. The group theme color palette generation module 206 is configured to generate a group theme color palette 216 that represents dominant colors of the image color palettes 212-214. In the illustrated example, the group theme color palette 216 has been reduced to four representative colors. The quantity of colors in the group theme color palette 216 may be based on a method similar to the method described below for determining a quantity of colors of image color palettes 212-214, the quantity may be fixed, and/or the quantity may be selectable or adjustable by a user. If a quantity of colors in the group theme color palette 216 is adjustable by a user, the group theme color palette 216 may be reconfigured dynamically, including reconfiguring locations in the Lab color space of the colors of the group theme color palette 216.

After generating the group theme color palette 216, the color consistency module 108 employs a palette mapping module 208 to map colors of the image color palettes to colors of the group theme color palette 216. Colors of the image color palettes 212-214 may be mapped to a nearest color of the group theme color palette. Additionally, or alternatively, colors of the image color palettes 212-214 may be discouraged from mapping to the nearest color of the group theme color palette 216 if the colors are outside of a threshold amount of similarity to the nearest color of the group theme color palette 216 and/or if another color of a same image color palette is also mapped to the nearest color of the group theme color palette 216.

As illustrated in the mapped first image color palette 218, the colors of the first image color palette 212 are mapped, from left to right, to the first color of the group theme color palette 216, the third color of the group theme color palette 216, the second color of the group theme color palette 216, and the fourth color of the group theme color palette 216. The mapped nth image color palette 220 illustrates the colors of the nth image color palette 214 being mapped, from left to right, to the third color of the group theme color palette 216, the first color of the group theme color palette 220, and the fourth color of the group theme color palette 216.

In some implementations, colors of the group theme color palette 216 are updated to represent an average of the colors of the image color palettes 212-214 mapped to the respective colors of the group theme color palette 216. As discussed in further detail below, mapping and updating may be performed iteratively to produce a final group theme color palette 216 and mapping configuration.

The group theme color palette 216 may include medoid colors rather than mean values of each cluster. The medoid color is a color of an image color palette that is closest to the cluster center represented by the medoid color. This avoids introducing a new color that was not originally in image color palettes 212-214 for the group of images 106.

In some implementations, the palette mapping module 208 may also map the group theme color palette 216 to an external theme color palette. In some of these implementations, replacing all of the colors of the group theme color palette with all of the external theme colors may result in too much modification of the images. Instead, it may be desirable to incorporate colors of the external theme colors that are similar to those in the group theme color palette. To determine similarities of the colors of the group theme color palette with the external theme colors, colors of the group theme color palette may be mapped to an external theme color that is within a threshold hue value. For example, colors of the group theme color palette may be mapped to an external theme colors if they are within +18 degrees in the Labe color space. If multiple external theme colors are within the threshold hue value, the external theme color having the highest saturation level may be chosen. Additionally, external theme colors may be clustered by their hue values before mapping of the group theme color palette occurs.

This would result in image color palettes for the group of images being mapped to colors of the group theme color palette, and some of the colors of the group theme color palette being mapped to colors of the external theme color palette. Colors for the external theme color palette may be extracted from a theme image using methods and techniques described above, or may be chosen from a template color palette.

Returning again to FIG. 2, after the palette mapping module 208 has mapped the color of the image color palettes 212-214 to the group theme color palette 216, color consistency module 108 employs an image recoloring module 210 to recolor pixels of the images based on the mapping. In an example implementation of the color consistency module 108, the image color palettes are recolored by modifying initial image color palettes into modified image color palettes based on the mapping to the group theme color palette. Images may then be recolored by modifying pixels of the images based on the initial image color palettes and the modified image color palettes. After recoloring image pixels, images 106 will be modified to be more color consistent while maintaining contrast within individual images.

The image color palette extraction module 204 may execute computer readable instructions to implement k-means clustering techniques to extract an image color palette. In an example implementation, the Lab color space may be quantized into a small number of bins b×b×b (e.g., b=16). For each bin, a mean value $c_i$ is computed by the color palette extraction module 204 in the Lab color space and a quantity of colors $n_i$ per bin is determined. In some implementations, a color palette for each of the images 106 may be calculated and a histogram may be generated to determine a quantity of image pixels associated with each color in each image color palette 212-214. The quantity of colors per bin is used to determine which bins will be represented by a color in the image color palette by the color palette extraction module 204.

Alternatively, the k-means calculation may be adapted by the color palette extraction module 204 to consider only ab channels of the Lab color space, reducing the calculation to two dimensional clustering thereby reducing a computing expense of extracting the image color palette. This technique may simplify calculation of image color palettes 232, 234 and allow for a calculation to be performed more quickly. This method will be used in the calculations to follow, but the b×b×b Lab color space could also be used in the calculations below.

Centroids may be initialized based on dominant and distinct colors by the color palette extraction module 204. Specifically, a first centroid being a color $c_i$ may represent a bin with the largest weight $n_i$ on the image color palette. Next all of the weights $n_i$ may be attenuated by a factor $$1 - \exp\left(-\frac{d_{ij}^2}{\sigma^2}\right),$$

where $d_{ij}$ is a distance in the Lab color space from $c_i$ to $c_j$ and σ expresses a falloff value (e.g., 80). A bin with the highest remaining weight $n_i$ is also chosen by the color consistency module 108 for inclusion on the image color palette. This process is repeated until a desired quantity of bins k are chosen by the color consistency module 108.

In some implementations, a desired quantity of bins k may be based on a percentage of explained variance. To calculate an explained variance, distortion is calculated by summing distances between each color point of the image and an overall mean color. K-means clustering may then performed for different values of k within a specified range (e.g., 2-7). For each value of k, within-group distortion is calculated as a sum of the distance of each point in a cluster to its center. Next, a ratio of the within-group distortion to the total distortion is evaluated. If the ratio is less than a predetermined threshold (e.g., 0.1), the value of k is sufficiently large. The smallest value of k that is sufficiently large is chosen as the quantity of clusters and a corresponding image color palette is determined to represent the centroids of the k clusters. In some implementations, a centroid may be represented in the image color palette by a medoid, being a closest color to a mean value of the cluster center that is actually found in the original image. This avoids introducing a new color that was not originally in the image.

Variations to the above method for generating an image color palette are contemplated, such as using a predetermined quantity k clusters, or a quantity of colors based on a quantity of bins having a threshold number, or proportion, of pixels of the image. Additionally, the centroids may be preset locations in the Lab color space.

To generate a group theme color palette 216, the group theme color palette generation module 206 may perform a modified k-means clustering technique on the set of image color palettes 212-214. Modified k-means clustering techniques may include accounting for a user's desire to maintain image quality through color contrast. This may be accomplished by discouraging color palette reduction and/or discouraging forced color assignments of a dissimilar, or unique, color of an image color palette that is outside a threshold amount of similarity to the group theme color palette 216.

For example, to discourage image color palette reduction and discourage a forced color assignment, the following group theme color palette optimization function may be minimized:

$$\operatorname*{argmin}_{T^{G},g} \sum_{i=1}^{n} \left[ \sum_{j=1}^{k_i} (1 - \delta(g_j^i))w_j^i \|P_j^i - T_{g_j^i}^G\|^2 + \right.$$

$$\left. \gamma \sum_{j_1=1}^{k_i} \sum_{j_2 \neq j_1}^{k_i} h(g_{j_1}^i, g_{j_2}^i) + \eta \sum_{j=1}^{k_i} w_j^i \delta(g_j^i) \right],$$

where the function h(x,y) is defined as follows:

$$h(x, y) = \begin{cases} 1, & \text{if } x = y, x \neq 0, y \neq 0 \\ 0, & \text{otherwise} \end{cases},$$

and the function δ(x) is defined as follows $$\delta(x) = \begin{cases} 1, & \text{if } x = 0 \\ 0, & \text{otherwise} \end{cases}.$$

In the group theme color palette optimization function, the first term represents a traditional weighted k-means clustering operation on the set of color palettes $\{P^i\}_{i=1}^{n}$, where $P_j^i$ represents an ab value for a jth color in the ith image's color palette. The first term ("dissimilarity penalty") penalizes dissimilarity between an image color palette color and a group theme color palette to which it is mapped. The weights $w_j^i$ represent a quantity of pixels associated with the jth color in the ith image's color palette. The term $T_{g_j^i}^G$ represents the colors in the group theme color palette, where $g_j^i$ is defined as the assignment of the ith color palette and its jth color to one of the colors of the group theme color palette, where $g_j^i \in \{0, 1, \ldots, m\}$, and $g_j^i=0$ means that there is no match to the group theme.

The second term in the group theme color palette optimization function ("color palette reduction penalty") penalizes, or acts to discourage, color palette reduction. Therefore, if a color palette reduction penalty of an original assignment is greater than a dissimilarity penalty of a subsequent mapping assignment, a color of an image color palette will be given the subsequent mapping assignment. The third term in the group theme color palette optimization function ("non-mapping penalty") penalizes, or acts to discourage, leaving colors of image color palettes unmapped. Therefore, if a dissimilarity penalty of an original assignment for a color of an image color palette is higher than a non-mapping penalty, the color of the image color palette will be left unmapped. By increasing or decreasing cost coefficient γ, the group theme color palette optimization function can decrease or increase color palette reduction, respectively, by modifying a penalty for color palette reduction. By increasing or decreasing cost coefficient η, the group theme color palette optimization function can be made to force color mappings or to allow for unmatched dissimilar colors, respectively, by modifying a penalty for leaving colors of color palettes unmapped. To perform traditional k-means clustering, a small value for γ and a large value for η, may be used such as (γ=0,η=$10^{10}$). To discourage color palette reduction, increasing γ, such as (γ=$10^2$,η=$10^{10}$) may be used. For discouraging forced assignment of dissimilar colors, reducing η from the traditional k-means clustering, such as (γ=0,η=$10^3$), may be used. To discourage color palette reduction and forced assignment of dissimilar colors, increasing γ and reducing η, such as (γ=$10^2$,η=25×$10^3$), may be used.

Optimizing the group theme color palette optimization function can be performed iteratively by mapping colors of image color palettes 212-214 to colors of the group theme color palette 216, then updating the colors of the group theme color palette 216 based on the assignment. Alternatively, optimizing the group theme color palette optimization function can be performed using high level calculus; however, using high level calculus may be overly burdensome on some computing devices.

If optimizing is performed iteratively, an assigning iteration may include fixing $T^G$ and solving for mapping assignment $g^i$ for each image $I^i$. An updating iteration may include fixing g and solving for a subsequent group theme color palette $T^G$. The colors of the subsequent group theme color palette are calculated as a weighted mean of observations in the new clusters. This process may continue iteratively until no change of assignment g is made, or alternatively, it may be performed a set quantity of times. The output of this process is a group theme color palette $T^G$ of size m and mapping assignments g.

The color consistency module 108 employs an image recoloring module 210 to recolor pixels of the images based on results of the palette mapping module 208. In an example implementation of the color consistency module 108, after obtaining the group theme color palette 216, the image color palettes are recolored by modifying initial image color palettes $P^i$ into modified image color palettes $\hat{P}^i$ based on the mapping to the group theme color palette. Images are then recolored by modifying pixels in the images based on the initial image color palettes and the modified image color palettes. In one implementation, a set of mapping functions is defined for each pair of colors of the initial image color palette $P_i$ and colors of the modified image color palette $\hat{P}_i$. The mapping functions may be performed as a translation in ab channels of the Lab color space defined by a change of a color from an initial image color palette to a color of a modified image color palette. This can be expressed as:

$$f_j(x) = x + \hat{P}_j - P_j$$

where x is the ab values of a color in an image and j={1, . . . , k}. These mapping functions may be blended together by their weights in the following equation:

$$f(x) = \sum_{j=1}^{k} \alpha_j(x) f_j(x),$$

where a weight $\alpha_j(x)=1/(\|x-P_j\|+\in)$ and $\in$ is a small number to avoid dividing by zero (e.g., $\in=10^{-4}$) for each pixel color. The weights may be normalized such that $\Sigma_{j=1}^{k}\alpha_j(x)=1$ for each pixel color x. Using this method, variation of pixel colors within clusters can be maintained after recoloring.

Example Procedures

This section describes with reference to FIGS. 3-6, example procedures relating to modifying a group of images for color consistency. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some embodiments, the procedures may be performed by a suitably configured device, such as an example computing device 102 (of FIG. 1) or 702 (of FIG. 7) using a color consistency module 108 (e.g., of FIGS. 1 and 2). The description of the procedure of FIGS. 3-5 reference items from the previous FIGS. 1 and 2.

Figure 3:
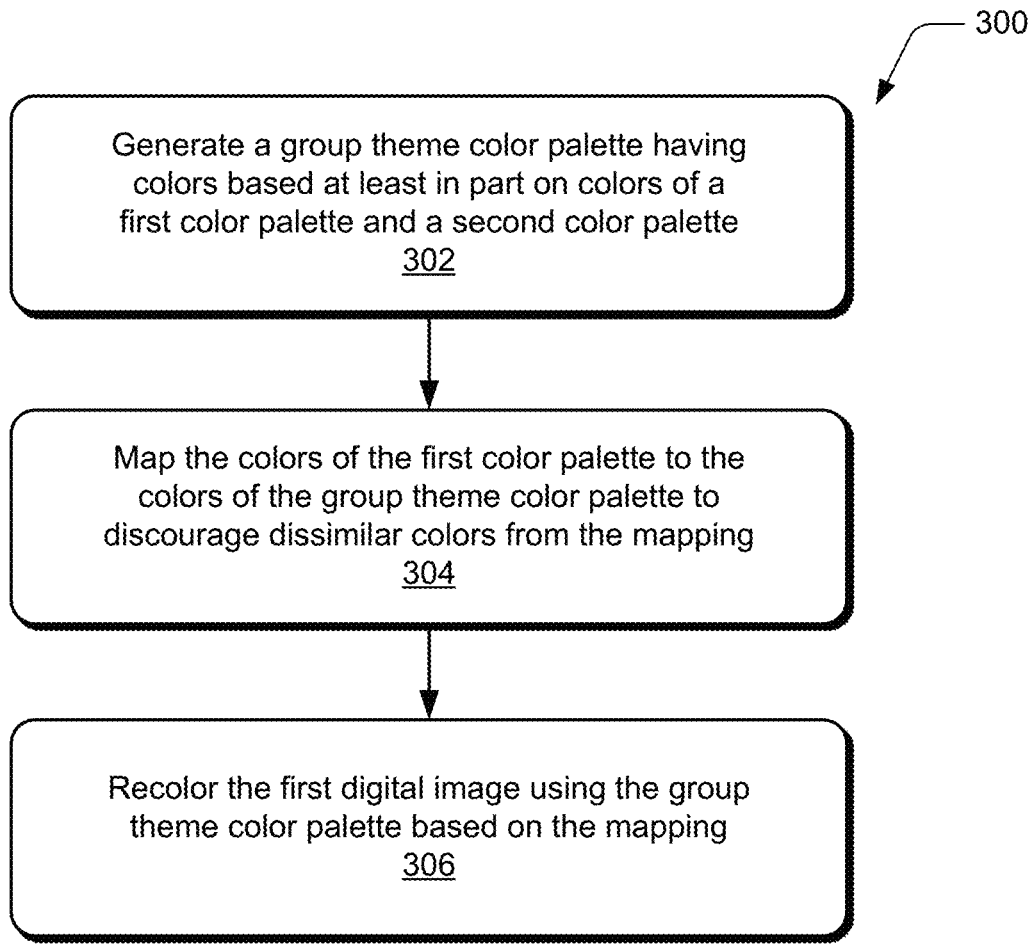
FIG. 3 is a flow diagram depicting a procedure in an example implementation in which an image group color consistency technique is used to improve color consistency for a group of images.

FIG. 3 is a flow chart illustrating an example procedure 300 for modifying a group of images for color consistency in accordance with one or more example embodiments. Example procedure 300 may be implemented by a computing device having non-transitory computer readable storage medium such as computer-readable media 110. The procedure 300 includes operations 302-306. By way of example, the procedure 300 is directed to recoloring a group of images using color consistency module 108 to improve color consistency for the group of images. At operation 302, a group theme color palette is generated having colors based at least in part on colors of a first color palette and a second color palette. For example, the group theme color palette is generated by the group theme color palette generation module 206 of the color consistency module 108. The first color palette may be generated for, or extracted from, a first image and the second color palette is generated for, or extracted from, a second image at operation using, for example, image color palette extraction module 204 of the color consistency module 108. The first color palette and the second color palette are based, at least in part, on colors of pixels from the first image and the second image, respectively.

At operation 304, colors of the first color palette are mapped to the colors of the group theme color palette to discourage dissimilar colors from the mapping. For example, the mapping may be performed by the palette mapping module 208 while employing contrast preservation techniques including discouraging dissimilar colors from the mapping. Contrast preservation techniques may also include discouraging color palette reduction. The discouraging of operation 304 may be based at least in part on a group theme color palette optimization function. In some implementations, the group theme color palette is updated based on the mapping of operation 304. The group theme color palette may also be updated to include colors that better represent colors of the image color palettes mapped to the colors of the group theme color palette. At operation 306, the first digital image is recolored using the group theme color palette based on the mapping. Image recoloring module 210, for example, may recolor the first digital image by modifying one or more pixels of the first image represented by a color of the first color palette based on the mapping. In some embodiments, some or all other images of a group of images are modified based on the mapping, thus resulting in a color consistent group of images having preserved contrast within the images of the group of images.

Figure 4:
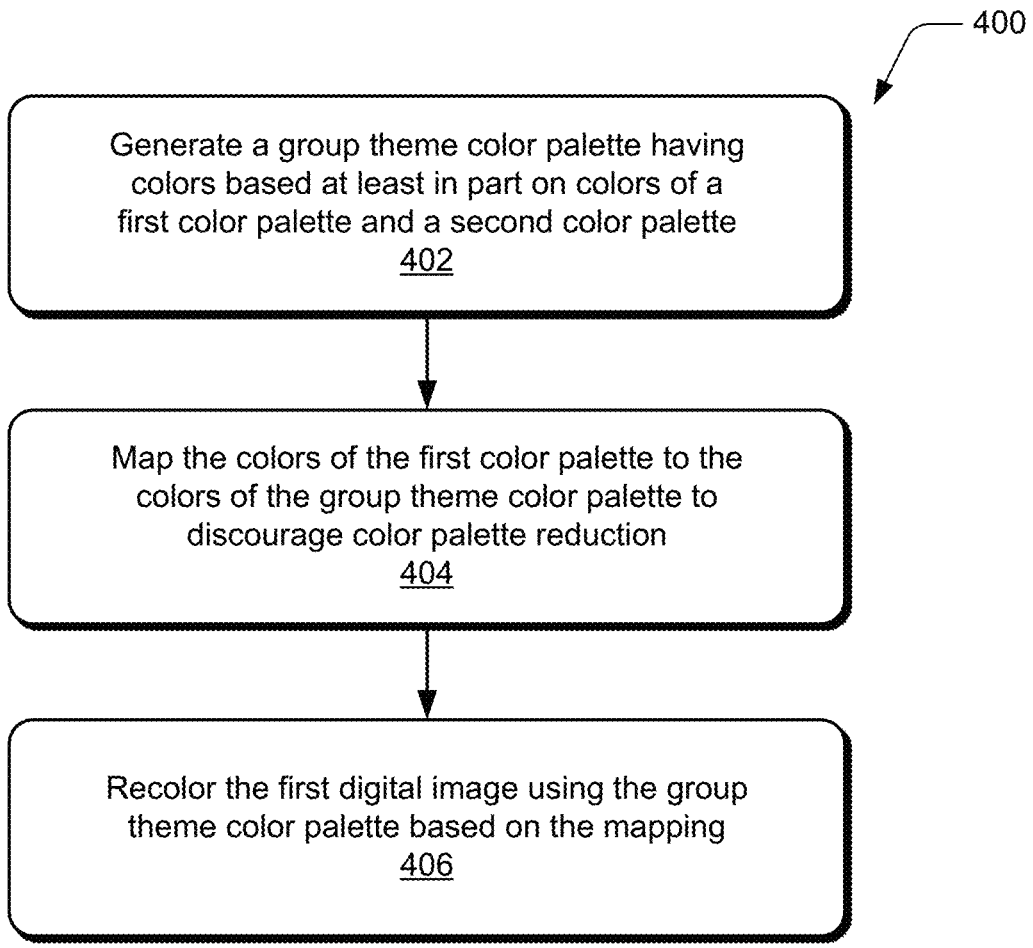
FIG. 4 is a flow diagram depicting a procedure in an example implementation in which an image group color consistency technique is used that optionally includes discouraging mapping of dissimilar colors to the group theme color palette and discouraging color palette reduction.

FIG. 4 is a flow chart illustrating an example procedure 400 for modifying a group of images for color consistency in accordance with one or more example embodiments. Example procedure 400 may be implemented by a computing device having non-transitory computer readable storage medium such as computer-readable media 110. The procedure 400 includes operations 402-406. By way of example, the procedure 400 is directed to recoloring a group of images using color consistency module 108 to improve color consistency for the group of images. At operation 402, a group theme color palette is generated having colors based at least in part on colors of a first color palette and a second color palette. For example, the group theme color palette is generated by the group theme color palette generation module 206 of the color consistency module 108. The first color palette may be generated for, or extracted from, a first image and the second color palette is generated for, or extracted from, a second image at operation using, for example, image color palette extraction module 204 of the color consistency module 108. The first color palette and the second color palette are based, at least in part, on colors of pixels from the first image and the second image, respectively.

At operation 404, colors of the first color palette are mapped to the colors of the group theme color palette to discourage color palette reduction. For example, the mapping may be performed by the palette mapping module 208 while employing contrast preservation techniques including discouraging color palette reduction. Contrast preservation techniques may also include discouraging mapping of dissimilar colors. The discouraging of operation 404 may be based at least in part on a group theme color palette optimization function. In some implementations, the group theme color palette is updated based on the mapping of operation 404. In at least some of these implementations, the mapping is reconfigured with subsequent mapping assignments based on the updated group theme color palette in an iterative process. The group theme color palette may also be updated to include colors that better represent colors of the image color palettes mapped to the colors of the group theme color palette. At operation 406, the first digital image is recolored using the group theme color palette based on the mapping. Image recoloring module 210, for example, may recolor the first digital image by modifying one or more pixels of the first image represented by a color of the first color palette based on the mapping. In some embodiments, some or all other images of a group of images are modified based on the mapping, thus resulting in a color consistent group of images having preserved contrast within the images of the group of images.

Figure 5:
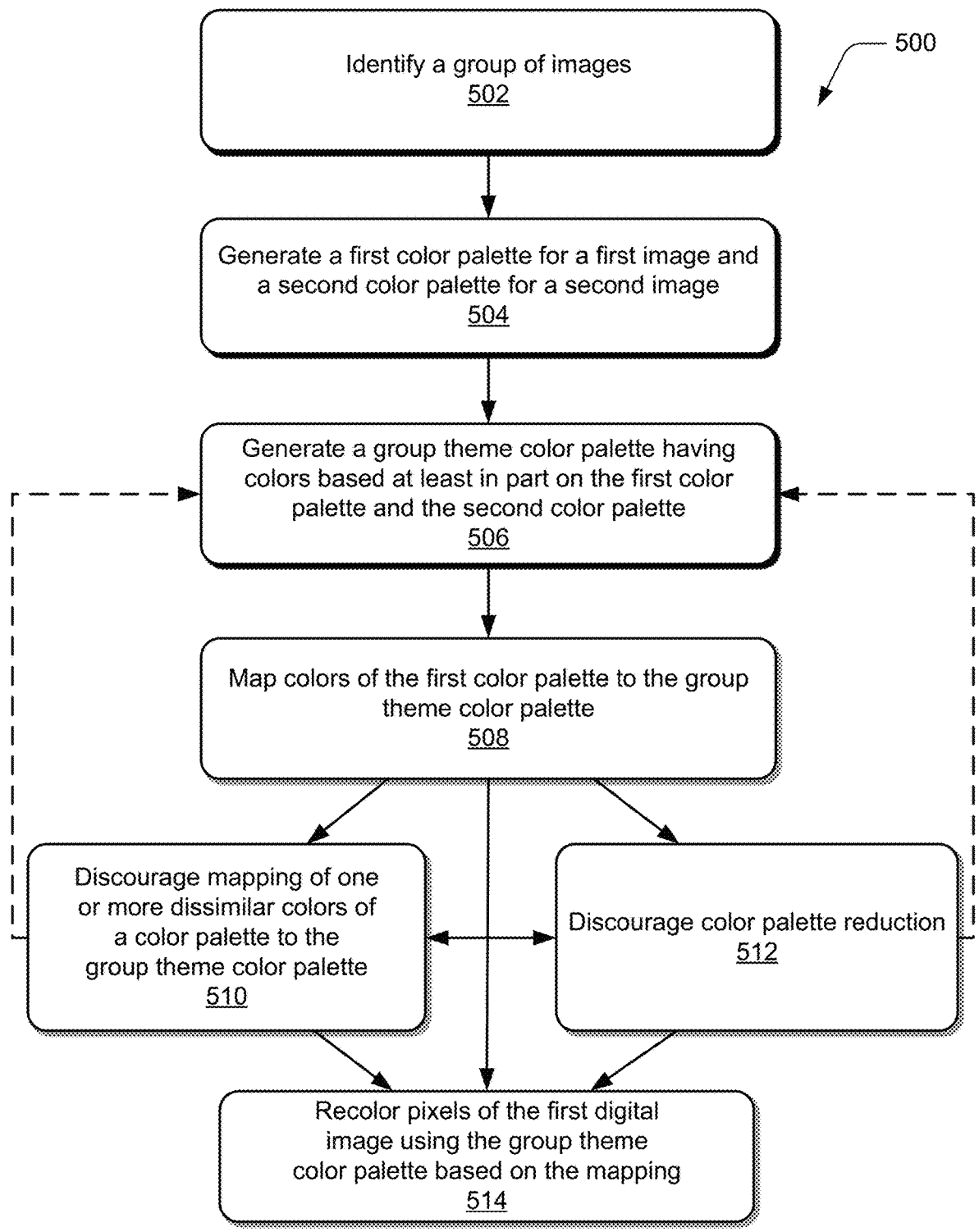
FIG. 5 is a flow diagram depicting a procedure in an example implementation in which an image group color consistency technique is used that may include mapping group theme color palette colors to an external theme color palette or receiving user input to adjust mapping.

FIG. 5 is a flow chart illustrating another example procedure 500 for modifying a group of images for color consistency with one or more example embodiments. Example procedure 500 may be implemented by a computing device having non-transitory computer readable storage medium such as computer-readable media 110. At step 502, a group of images is identified by, for example, the color consistency module 108. The group of images may be identified as a selection of images in electronic storage 112 of computing device 102, images stored on a remote computing device such as a server or image database that are accessed via a network, images stored on a second local device such as a smart phone or gaming device, or some combination of devices. The group of images may be identified by selecting multiple images for creating digital media content within a computer application such as a local or network-based digital media creation application.

At operation 504, a first color palette and a second color palette are generated for a first image and a second image respectively using, for example, image color palette extraction module 204. A group theme color palette is generated having colors based at least in part on the first color palette and the second color palette at operation 506. For example, the group theme color palette may be generated by the group theme color palette generation module 206. In some implementations, the group theme color palette is generated based on each image color palette in the identified group of images including the first color palette and the second palette. Alternatively, the group theme color palette may be generated based on color palettes of a selected subset of images in the group of images, such as only the first color palette and the second color palette.

Colors of the first color palette are mapped to the group theme color palette at operation 508. The mapping may be performed, for example, by the palette mapping module 208. The mapping at operation 508 may be a preliminary mapping before performing one or both of optional operations 510 and 512 to modify the mapping. Alternatively, operation 508 may be performed concurrently with one or both of optional operations 510 and 512 to produce a mapping result.

At operation 510, mapping one or more dissimilar colors of image color palettes to the group theme color palette is discouraged. Colors may be determined to be dissimilar based on a group theme color palette optimization function. Alternatively or additionally, colors may be determined to be dissimilar based in part on a distance in the Lab color space from the colors of the group theme color palette. A threshold distance for a determination of dissimilarity may be based on a group theme color palette optimization function, a predetermined Lab color space distance, or a statistical determination of the color being an outlier.

A second optional operation 512 includes discouraging color palette reduction caused by multiple colors of a color palette mapping to a single color of the group theme color palette. Operation 512 may result in prohibiting multiple colors of a color palette from mapping to the same color of the group theme color palette. Alternatively, operation 512 may result in a reduction of a quantity of colors of a color palette mapped to a single color of the group theme color palette. Operation 512 may be accomplished using a group theme color palette optimization function by the color consistency module 108. Alternatively, operation 512 may be accomplished by setting a limit for a quantity of colors of an image color palette that can be mapped to a single color of the group theme color palette. In some implementations, a color palette reduction limit r may be determined such that no more than r colors of an image color palette may be mapped to a color of the group theme color palette already having a color of the image color palette mapped to it.

After performing one or both of optional operations 510 and 512, a modified, or updated, group theme color palette may be generated by returning to operation 506. Thus, operations 506, 508 and one or both of optional operations 510 and 512 may be performed in an iterative process until a final group theme color palette and final mapping assignments are reached. A determination that the final group theme color palette and mapping is reached may be based on a determination that a group theme color palette of a previous iteration will not be modified, or a modification is less than a threshold amount, by performing one or both of optional operations 510 and 512. Alternatively, a determination that the final group theme color palette and mapping is reached may be based on a predetermined quantity of iterations. Operations 508, 510, and 512 may be performed by the palette mapping module 208. Alternatively, operation 508 may be performed by the palette mapping module 208 and operations 510 and 512 may be performed by the group theme color palette generation module 206.

At operation 514, pixels of the first digital image are recolored using the group theme color palette based on the mapping. For example, the image recoloring module 210 may recolor pixels of the first digital image as described above. for color consistency as described above. In some implementations, some or all other images of the group of images identified at operation 502 are modified for color consistency by mapping color palettes for the some or all other images and recoloring pixels of the some or all other images using the group theme color palette based on the mapping.

In some implementations, the group theme color palette is generated based on a subset of images of the group of images according to one of the discussed methods and at least one image not in the subset of images is modified based on a mapping of its color palette to the group theme color palette. For example, in a group of 5 images, the group theme color palette may be based on the first three images and, once the group theme color palette is generated, the fourth and fifth images are mapped to the group theme color palette and at least the fourth and fifth images are modified based on the mapping. In other implementations, the group theme color palette may be generated based on color palettes of each image of the group of images and each image may be modified based on mapping color palettes of each image.

Example Results

Figure 6:
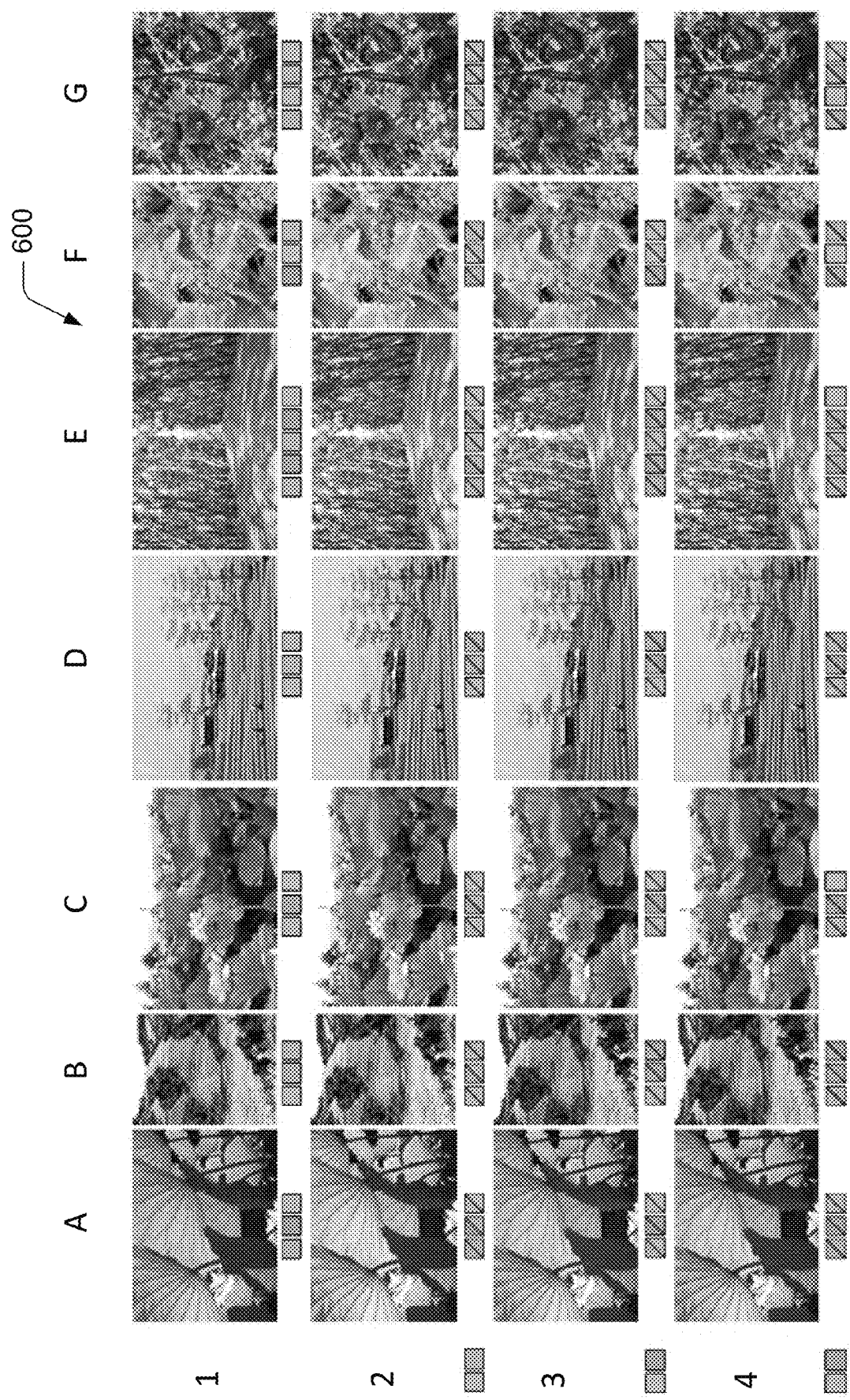
FIG. 6 illustrates example results of implementing techniques described herein including discouraging forced mapping and discouraging color palette reduction.

FIG. 6 illustrates results of implementing one or more techniques for improving color consistency for a group of images. Columns A, B, C, D, E, F, and G identify seven images included in the group of images.

Row 1 identifies the group of images before recoloring for color consistency. As shown under the images in row 1, an image color palette has been extracted for each of the images in the group of images. As illustrated, images A, B, C, D, and F each have a respective color palette consisting of three colors. Image E has a color palette consisting of five colors and image G has a color palette consisting of four colors.

Row 2 identifies the group of images after implementing a basic k-means recoloring technique. As shown under each of the images of row 2, each color of the image color palettes is mapped to a color of the group theme color palette for recoloring. As can be seen, images of row 2 have a dulled and unattractive appearance because of a dramatic decrease in contrast when compared to row 1. Particularly, the flowers in images C, F, and G have been dulled because of forced mapping of dissimilar colors. Additionally, image A shows both shades of green on its image color palette being mapped to a same shade of green of the group theme color palette. This shows a negative effect of color palette reduction.

Row 3 identifies results of the group of images after implementing a k-means recoloring method while discouraging color palette reduction. Results of row 3 may be achieved by employing a method disclosed herein, such as example procedure 400 implementing operations 402, 404, 406, 408, 410, 414, and 416. As shown in image A, the two shades of green of the image color palette are no longer mapped to the same color of the group theme color palette. Additionally, the colors of the group theme color palette have been changed because of the change of mapping assignments based on discouraging color palette reduction.

Row 4 identifies results of the group of images after implementing a k-means recoloring method while discouraging color palette reduction and discouraging forced mapping. Results of row 4 may be achieved by employing a method disclosed herein, such as example procedure 400 implementing operations 402, 404, 406, 408, 410, 412, 414, and 416. As illustrated, the colors of the group of images in row 4 are color consistent, while maintaining contrast in individual images. For example, the flowers of image C, F, and G are colors that are not mapped to the group theme color palette, allowing them to retain their unique coloring that is dissimilar to the colors of the group theme color palette. Additionally, the group theme color palette has changed to include colors that better represent the remaining mapped colors of the group of images.

Example System and Device

Figure 7:
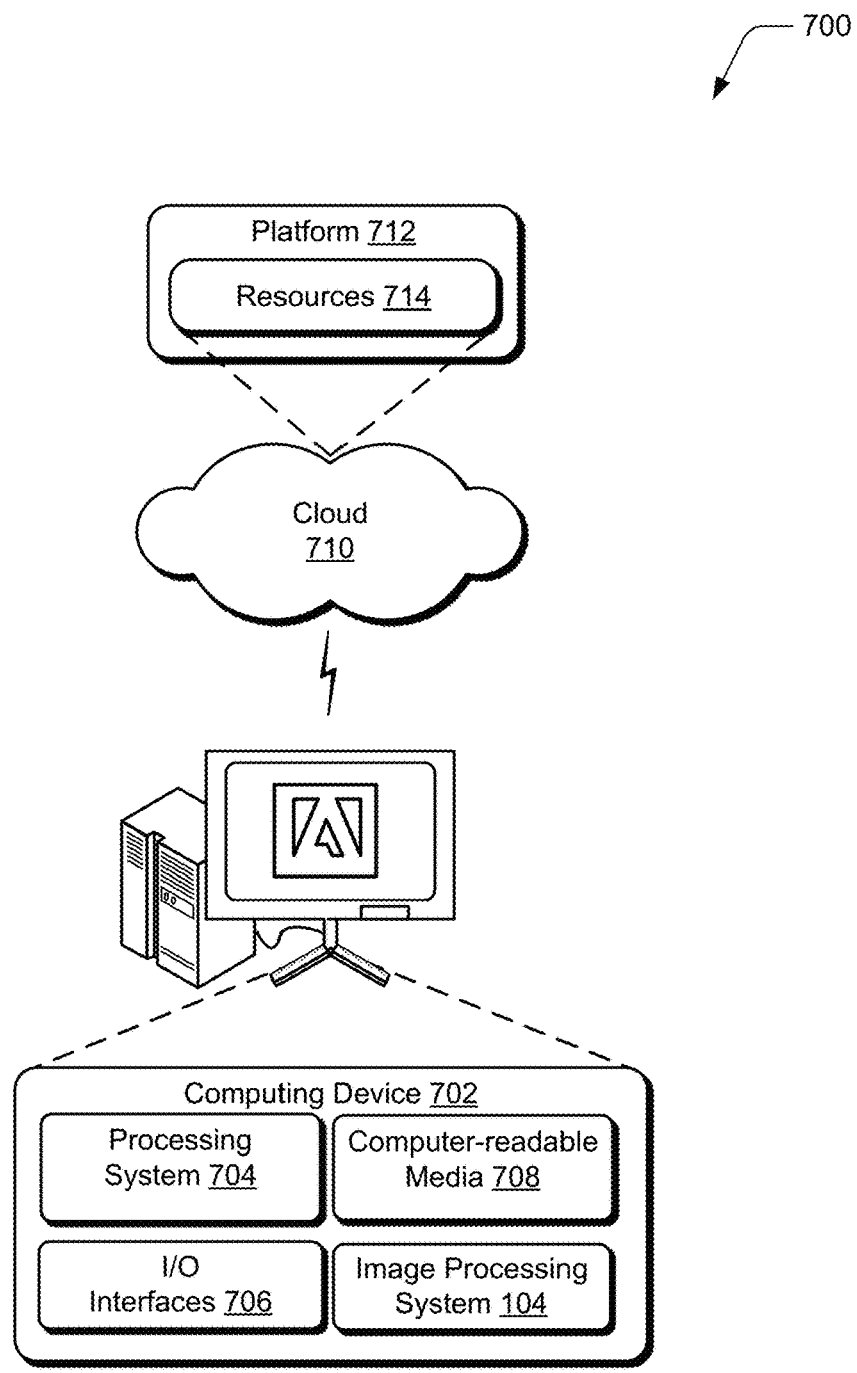
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the image processing system 708. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 708, and one or more I/O interfaces 706 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 may be implemented, at least in part, in hardware elements that may be configured as processors, functional blocks, and so forth. This may include implementation in hardware as an application specific integrated circuit or other logic device formed using one or more semiconductors. The hardware elements are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 708 is illustrated as including electronic storage 712. The electronic storage 712 represents memory/storage capacity associated with one or more computer-readable media. The electronic storage 712 may include volatile media (such as random access memory (RAM)) and/or nonvolatile media (such as read only memory (ROM), Flash memory, optical disks, magnetic disks, and so forth). The electronic storage 712 may include fixed media (e.g., RAM, ROM, a fixed hard drive, and so on) as well as removable media (e.g., Flash memory, a removable hard drive, an optical disc, and so forth). The computer-readable media 708 may be configured in a variety of other ways as further described below.

Input/output interface(s) 706 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, computer-readable media 708 and other hardware elements are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 710 via a platform 712 as described below.

The cloud 710 includes and/or is representative of a platform 712 for resources 714. The platform 712 abstracts underlying functionality of hardware (e.g., servers) and software resources 714 of the cloud 710. The resources 714 may include applications and/or data that can be utilized while computer processing is executed on servers that are remote from the computing device 702. Resources 714 can also include services provided over the Internet and/or through a subscriber network, such as a cellular or Wi-Fi network.

The platform 712 may abstract resources and functions to connect the computing device 702 with other computing devices. The platform 712 may also serve to abstract scaling of resources to provide a corresponding level of scale to encountered demand for the resources 714 that are implemented via the platform 712. Accordingly, in an interconnected device embodiment, implementation of functionality described herein may be distributed throughout the system 700. For example, the functionality may be implemented in part on the computing device 702 as well as via the platform 712 that abstracts the functionality of the cloud 710.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to transform a first image to include consistent color, a method implemented by at least one computing device, the method comprising:
   generating, by the at least one computing device, a group theme color palette having colors based at least in part on colors of a first color palette and a second color palette, the first color palette and the second color palette based on colors of pixels from the first image and a second image, respectively;
   mapping, by the at least one computing device, the colors of the first color palette to the colors of the group theme color palette such that at least one color from the first color palette is also included in the group theme color palette; and
   recoloring, by the at least one computing device, pixels of the first digital image using the group theme color palette based on the mapping.

2. A method as recited in claim 1, wherein dissimilar colors are discouraged from the mapping based at least in part on a group theme color palette optimization function.

3. A method as recited in claim 2, wherein the group theme color palette optimization function includes a non-mapping penalty.

4. A method as recited in claim 3, wherein, based on user input, a cost coefficient is increased or decreased to modify the non-mapping penalty.

5. A method as recited in claim 3, wherein a color of the first color palette is left unmapped based on a dissimilarity penalty.

6. A method as recited in claim 2, wherein the group theme color palette optimization function includes a color palette reduction penalty.

7. A method as recited in claim 6, wherein a color of the second color palette is given a subsequent mapping assignment based on a color palette reduction penalty of an original mapping assignment being greater than a dissimilarity penalty of the subsequent mapping assignment.

8. A method as recited in claim 6, wherein, based on user input, a cost coefficient is increased or decreased to modify the color palette reduction penalty.

9. A method as recited in claim 6, further comprising:
   mapping, by the computing device, the colors of a third color palette based on colors of pixels from a third image to the group theme color palette; and
   recoloring, by the at least one computing device, pixels of the third digital image using the group theme color palette based on the mapping.

10. A method as recited in claim 1, wherein the first digital image comprises a subject that is unrelated to a subject of the second digital image.

11. A computing device comprising:
    a processor; and
    a computer readable storage medium having stored thereon instructions that implement a platform of the computing device that, responsive to execution by the processor, cause the processor to perform operations including:
    generating a group theme color palette having colors based at least in part on at least one of a plurality of image color palettes corresponding to a plurality of digital images of the group of digital images and based on colors of pixels from the plurality of corresponding digital images;
    mapping the colors of the first color palette to the colors of the group theme color palette such that at least one color of the colors of the first color palette is not mapped to the group theme color palette; and
    recoloring, based on the mapping, pixels of the first digital image using the group theme color palette based on the mapping.

12. A computing device as recited in claim 11, wherein color palette reduction is discouraged based at least in part on a group theme color palette optimization function.

13. A computing device as recited in claim 12, wherein the group theme color palette optimization function includes a color palette reduction penalty.

14. A computing device as recited in claim 13, wherein at least one color of the plurality of colors of the first color palette is given a subsequent mapping assignment based on a color palette reduction penalty of an original assignment being greater than a dissimilarity penalty of the subsequent mapping assignment.

15. A computing device as recited in claim 12, wherein the group theme color palette optimization function includes a non-mapping penalty.

16. A computing device as recited in claim 15, wherein a color of the plurality of colors of the first color palette is left unmapped based on a dissimilarity penalty of an original assignment being greater than a non-mapping penalty in the group theme color palette optimization function.

17. In a digital medium environment to transform a group of digital images for color consistency, a system comprising:

means for generating a group theme color palette having colors based at least in part on a first color palette and a second color palette, the first color palette based on colors of pixels from a first digital image and the second color palette based on color of pixels from a second digital image;

means for mapping the colors of the first color palette to the colors of the group theme color palette based at least in part on a non-mapping penalty; and means for recoloring pixels of the first digital image using the group theme color palette based on the mapping.

18. A system as recited in claim 17, wherein the generating means and the mapping means are based at least in part on a group theme color palette optimization function.

19. A system as recited in claim 17, wherein the generating means and the mapping means repeat iteratively, and at least one color of the group theme color palette is updated based at least in part on the mapping means.

20. A system as recited in claim 17, wherein the first digital image comprises a subject that is unrelated to a subject comprised in the second digital image.

* * * * *